US006963294B2

(12) United States Patent  
Kurosawa

(10) Patent No.: US 6,963,294 B2
(45) Date of Patent: Nov. 8, 2005

(54) NAVIGATION SYSTEM AND MAP DISPLAY

(75) Inventor: Takeshi Kurosawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/325,608

(22) Filed: Dec. 19, 2002

(65) Prior Publication Data
US 2003/0132862 A1 Jul. 17, 2003

(30) Foreign Application Priority Data
Dec. 28, 2001 (JP) ............................. 2001-401604

(51) Int. Cl.[7] .......................................... G08G 1/123
(52) U.S. Cl. ............. 340/995; 340/995.19; 340/995.24
(58) Field of Search ............... 340/995.1, 995.23, 340/995.2, 995.21, 995.17, 995.19, 995.24

(56) References Cited

U.S. PATENT DOCUMENTS

| | | | |
|---|---|---|---|
| 5,999,879 A | 12/1999 | Yano | ........................... 701/208 |
| 6,035,253 A * | 3/2000 | Hayashi et al. | .............. 701/211 |
| 6,247,019 B1 * | 6/2001 | Davies | ................... 707/103 R |
| 6,374,183 B1 * | 4/2002 | Oshida et al. | ............... 701/211 |
| 6,427,118 B1 | 7/2002 | Suzuki | ........................ 701/209 |
| 6,748,316 B2 * | 6/2004 | Takayama et al. | ........... 701/200 |
| 2001/0008991 A1 * | 7/2001 | Hamada et al. | .............. 701/209 |
| 2001/0019309 A1 * | 9/2001 | Saeki et al. | .................. 340/995 |
| 2002/0128773 A1 * | 9/2002 | Chowanic et al. | ........... 701/210 |

OTHER PUBLICATIONS

None.

* cited by examiner

Primary Examiner—Jeffery Hofsass
Assistant Examiner—Jennifer Stone
(74) Attorney, Agent, or Firm—Brinks Hofer Gilson & Lione

(57) ABSTRACT

In order to intuitively recognize a display relating to a route on a map, data of character strings and figures to be displayed on the map are stored in advance by relating a target designated by a character string or a figure to an associated link or node. When a recommended route is computed, character strings and figures related to a link and node through which the recommended route runs are displayed on the map together with the recommended route with emphasis in comparison to the other character strings and figures.

20 Claims, 9 Drawing Sheets

FIG. 2A

MAP DATA

| ADMIN DATA |
| --- |
| DRAWING RESOURCE DATA |
| INFORMATION SERVEICE DATA |
| BASIC MAP DATA |
| LINE DATA |

| DRAWING PARAMETER DATA |
| --- |
| LANDMARK DATA |

| UNIT ADMIN DATA |
| --- |
| UNIT DATA |
| UNIT DATA |
| ⋮ |
| UNIT DATA |

| ROAD UNIT |
| --- |
| DRAWING UNIT |

| LINE NO. |
| --- |
| ROAD CLASS |
| ROAD CHARACTER STRING |
| DRAWING DATA CODE |

LINE DATA RECORD

FIG. 2B

ROAD UNIT

| NODE LIST |
| --- |
| LINK TABLE |
| CONNECTION DATA |
| VICS LINK CONVERSION TABLE |

| NODE NO. |
| --- |
| NODE COORDINATE |
| NODE ATTRIBUTE |
| CONNECTION LINK NO. |
| ⋮ |
| CONNECTION LINK NO. |

NODE RECORD

| LINK NO. |
| --- |
| LINK ATTRIBUTE |
| NODE NO. 1 |
| NODE NO. 2 |
| LINK DISTANCE |
| LINK COST |
| LINE NO. |

LINK RECORD

NAVIGATION SYSTEM AND MAP DISPLAY

BACKGROUND OF THE INVENTION

1. Field of the Invention

The present invention relates to a map display technique of a navigation system for guiding a user along a route.

2. Description of the Related Art

As map display techniques in a navigation system for guiding a user along a route, a technique has been conventionally known in which a user's current position and route are easily recognized by superimposing the current position and a route to a destination on a map showing character strings such as a place name, road name, and facility name, and figures of facilities.

In such a technique, in order to enable the user to instantly recognize the character string and figure on the map, the character string and figure may be displayed in a different form for each target type. A character string showing a road, for example, is designated by a different color or font for each type such as an expressway and an ordinary road.

According to the conventional technique described above, since the character string and figure displayed on the map are required to have a size and position in consideration of visibility, the position and range of the character string or figure displayed on the map may not strictly correspond to the geographical position and range of an object represented by the character string or figure. If a displayed map includes a number of character strings or figures, an individual character string or figure, or the represented object, is difficult to distinguish.

Therefore, according to the conventional display technique, users may have difficulty in distinguishing a character string or a figure on a map, or in distinguishing the character string or figure representing an object relating to a route such as a facility along the route. In this case, the user's object relating to the route may be difficult to recognize on the map, so that the user can hardly utilize the object as a landmark of the route.

SUMMARY OF THE INVENTION

Accordingly, it is an object of the present invention to enable a target on a map concerning a route to be more intuitively recognized by a user.

In order to achieve the object mentioned above, a navigation system for displaying a route to a destination on a map according to the present invention comprises a memory unit for storing road network information indicating a road network and map information defining objects to be displayed on the map; a map drawing unit for drawing the map by drawing the objects on the basis of the map information; a route retrieval unit for retrieving a route to the destination on the basis of the road network information; and a navigation screen displaying unit for displaying a navigation screen expressing the route retrieved by the route retrieval unit on the map drawn by the map drawing unit, wherein in the map information, at least some of the objects are defined to relate to a road point or a road interval, and wherein the map drawing unit draws objects so that the objects defined to relate to a road point or a road interval through which the route runs are displayed on the navigation screen in configurations to be distinguished from the other objects.

In such a navigation system, for example, in the map information, an object expressing a target pertaining to a road may be defined to relate to a road point corresponding to a point on the road or a road interval corresponding to an interval of the road. Further, the object expressing a target facing a road may be defined to relate to a road point facing the target or a road interval facing the target, so that a navigation screen can be provided to users in which objects expressing a target pertaining to each road portion through which the route runs, and a target facing each road portion through which an intended route runs, are displayed in a way to distinguish them from other objects. Therefore, according to such a navigation screen, users can intuitively recognize a target on a map relating to a route.

In order to display an object that is a character string, defined to relate to a road point or a road interval through which the route runs, on the navigation screen in a configuration to be distinguished from other objects, the object may be drawn so as to be different in at least one of a font, a size, and a color from objects that are other character strings.

The road network information may be expressed as an aggregation of links having nodes as ends and joints of the links and in this case, the relationship in the map information between a road point or a road interval and an object may be efficiently defined by relating the object to the link or the node.

In addition, an alternative navigation system for displaying a map according to the present invention comprises a memory unit for storing road network information indicating a road network and map information defining objects to be displayed on the map; a map drawing unit for drawing the map by drawing the objects on the basis of the map information; a map displaying unit for generating a map screen having the drawn and displayed map; and a designation receiving unit for receiving the assignment or designation of one of a road and a road interval, wherein in the map information, at least some of the objects are defined to relate to a road point or a road interval, and wherein the map drawing unit draws the objects so that the objects defined to relate to a road point or a road interval included in the designated road or the designated road interval are displayed on the map screen in configurations to be distinguished from the other objects, or the map drawing unit draws only the objects defined to relate to a road point or a road interval included in the designated road point or the designated road interval.

According to such a navigation system, if the designation is received from a user, the user can obtain a map display in which an object related to a road interval or road is displayed in a configuration distinguished from the other objects merely by designating the road interval or road, so that a target relating to the road interval or road on the map can be instantly recognized. The designation may not be necessarily received from a user; alternatively, a road or road interval may be received according to an arbitrary condition. For example, a road interval through which the retrieved route runs may be received as a designated road interval.

In addition, road network information and map information received via a communication link, for example, may be stored in the navigation system and the memory unit in the map display technique described above.

BRIEF DESCRIPTION OF THE DRAWINGS

FIGS. 2A and 2B illustrate the content of map data according to the embodiment of the present invention;

DESCRIPTION OF THE PREFERRED EMBODIMENTS

An embodiment according to the present invention is described below as an automobile-mounted navigation system incorporating the invention.

Figure 1:
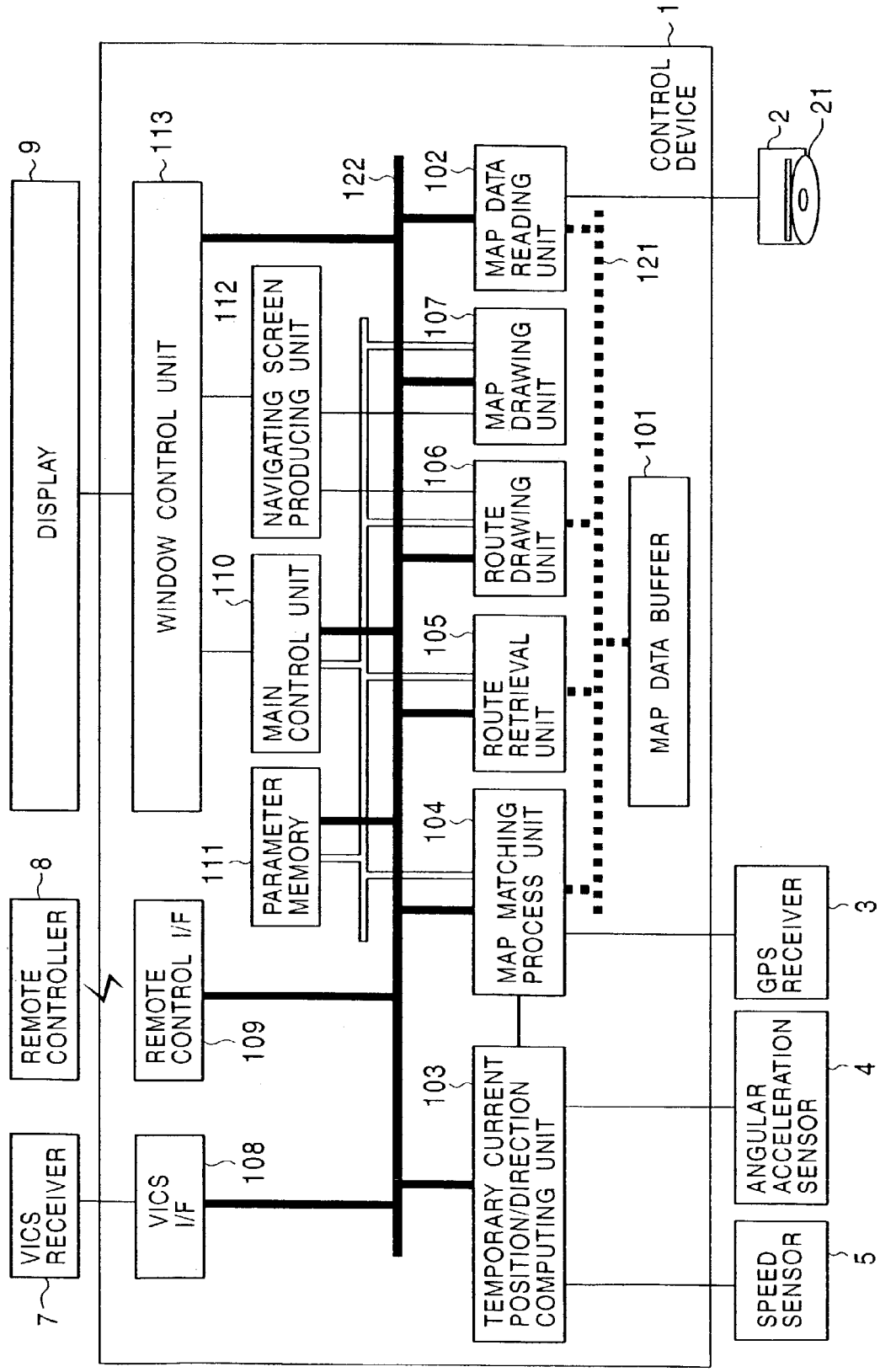
FIG. 1 is a block diagram of a navigation system according to an embodiment of the present invention.

FIG. 1 is a block diagram of a navigation system according to the embodiment.

As shown in the drawing, the navigation system comprises a control device 1, a storage media drive 2 for accessing a removable storage medium 21 such as a DVD-ROM or a CD-ROM storing road map data, a GPS (global positioning system) receiver 3, an angular acceleration sensor 4 such as a gyroscopic device, a vehicle speed sensor 5 such as a rotary pulse generator, a display 9, a VICS receiver 7 for receiving a broadcast of traffic information such as traffic congestion, and a remote controller 8 for receiving inputs by a user.

The control device 1 comprises a map data buffer 101, a map-data read process unit 102, a temporary current position/direction computing unit 103, a map matching process unit 104, a route retrieval unit 105, a route drawing unit 106, a map drawing unit 107, a VICS interface 108, a remote control interface 109, a main control unit 110, a parameter memory 111, a navigation screen producing unit 112, and a window control unit 113. Dotted lines 121 in the control device 1 of FIG. 1 indicate accessing routes of respective units to the map data stored in the map data buffer 101; bold lines 122 indicate routes between the main control unit 110 and the respective units; voided lines 123 indicate accessing routes of respective units to various data stored in the parameter memory 111; and thin lines connected to the window control unit 113 and the navigation screen producing unit 112 indicate routes of display information to the display 9.

However, the control device 1, as hardware, may be a CPU circuit having a general configuration including a microprocessor, memory, and peripheral devices such as a graphic processor and geometrical processor. In this case, the respective units of the control device 1 mentioned above may be embodied as processes carried out by the microprocessor, which executes a program prepared in advance. Also, in this case, such a program may be provided to the control device 1 via a storage medium or a communication link.

Next, configurations of map data stored in the storage medium will be explained.

The map data are organized in a unit called a pattern for each geographical region, and each pattern is constructed at a plurality of levels corresponding to a level of detail of the map. The map at each level of each pattern comprises one or a plurality of units, and each unit corresponds to a geographical region of the pattern to which it belongs, or a region divided from the geographical region, and the map of the corresponding region is designated at the level to which it belongs.

As shown in FIG. 2A, the map data comprises administration information describing the relationship between the respective units and the pattern, corresponding region, and level; drawing resource data storing the data of each drawing object for displaying on the map and a sharing portion of the drawing parameter; information service data for providing additional services such as location searching by a facility name or telephone number; and line data for controlling a correlation between each road and the map represented by each road and basic map data.

The drawing resource data comprises drawing parameter data storing the drawing parameter of each drawing object and landmark data storing the data of a landmark object.

The basic map data includes unit data for each unit mentioned above and unit administration information describing the relationship between the respective units and the pattern, corresponding region, and level; each unit data includes a road unit indicating a road network and a drawing unit indicating the map.

The line data includes a line data record for each line, and each line data record describes a line number of the line, a line class indicating the class of the line such as an expressway, national road, and prefectural road; a character string indicating a road name of the line, and a drawing data code assigning a display parameter of the line character string.

The road unit, as shown in FIG. 2B, includes a node list, a link table, connection data describing the connection and a correlation between other units and nodes/links, and a VICS conversion table describing the relationship between the link assigned by VICS broadcasting and the link in the road unit.

In the road unit, the road is designated as an aggregation of straight links, and an end of the link is a node. Such a node is specifically provided at a road junction point such as an intersection, and it is specifically provided at the boundary between adjacent units. Each link also has a direction, and between a node a and a node b, if the road is a one-way street, one link having its direction is provided while if the road is a two-way street, two links having directions opposite to each other are provided.

The node list includes a node record for each node, and each node record describes a node number, node coordinates, node attributes indicating an attribute such as a traffic regulation or that the node corresponds to a junction point, and a connection link number indicating the number of the link connected to the node.

The link table includes a link record for each link, and each link record describes a link number, link attributes indicating the number of lanes, etc., node No. 1 of the starting node of the link, node No. 2 of the terminating node of the link, link distance, a cost of the route retrieval given to the link, and a line number of the line to which the link belongs.

Figure 3:
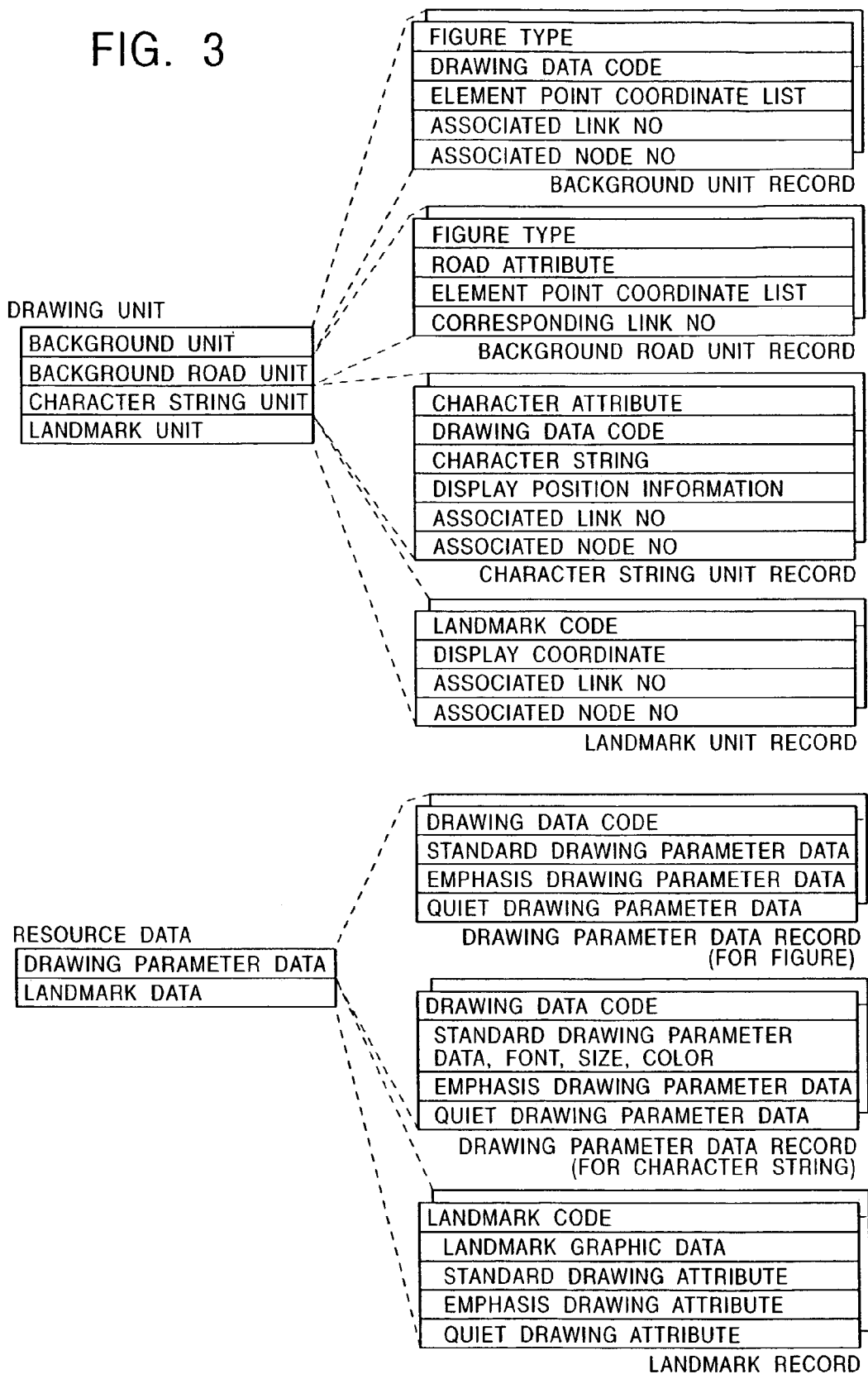
FIG. 3 illustrates the content of the map data according to the embodiment of the present invention.

The drawing unit, as shown in FIG. 3, includes a background unit, a background road unit, a character string unit, and a landmark unit. The background unit includes a background unit record storing drawing object information provided for each figure drawing object corresponding to a land shape and facility. The background road unit includes a background road unit record storing the drawing object information of a road figure indicating a road shape provided for each road portion. The character string unit includes a character string unit record storing drawing object information provided for each drawing object of the character string corresponding to a place name, road name, and facility name. The landmark unit includes a landmark unit record storing drawing object information provided for each drawing object of a landmark figure such as a restaurant or a gas station. In addition, the landmark figure denotes a mark figure indicating a facility class such as that of a gas station or a post office.

The background unit record includes a line drawing of a drawing object, a figure type such as a polygon, a drawing data code assigning a drawing parameter of the figure, an element-point coordinate list indicating a figure shape with a plurality of element-point coordinates on an outline, an associated link number that is the number of the link interrelating drawing objects of the figure, and an associated node number that is the number of the node interrelating drawing objects of the figure. If the drawing object defined by the background unit record is the drawing object of the facility figure, the drawing object is related to the link or node included in a road interval faced by the facility or a road interval from which the facility is visible, by the associated link number or the associated node number.

The background road unit record includes the line drawing of the drawing object, the figure type such as the polygon, a road attribute indicating a road class such as an expressway or a national road, the element-point coordinate list indicating the figure shape with a plurality of element-point coordinates on the outline, and a corresponding link number that is a number of the link whose figure is designated by the road figure.

The character string unit record includes a character attribute indicating vertical writing, horizontal writing, and inclination of a character string, a drawing data code assigning the drawing parameter of the character string, the character string, display position information indicating the position of the character string to be displayed, an associated link number that is the number of the link interrelating drawing objects of the character string, and an associated node number that is the number of the node interrelating drawing objects of the character string. The assignment of the position to be displayed from the display position information is performed using a method in that assigned are identification information (the link number when the object is a link, for example) of an object (a link, for example) having a coordinate designated by a character string and separately described, and the display side of the character string relative to the object, such as right/left/upper/lower side; or a method in that the display position is designated by a coordinate designated by a character string and by offsetting the display position of the character string from the coordinate. In the case that the drawing object defined by the character string unit record expresses a name of an intersection, bridge, or road, the drawing object is related to a link or node corresponding to the position or interval of the object having the name designated by the drawing object, which is a character string, with the associated link number or associated node number. In the case that the drawing object defined by the character string unit record is a name of adjunct road facilities such as an interchange or a service area, the drawing object is related to a link or node corresponding to the position or interval of the road with the facility related thereto and having the name designated by the drawing object, which is a character string, with the associated link number or associated node number.

The landmark unit record includes a landmark code assigning a landmark figure, the display coordinates of the landmark figure, an associated link number that is the number of the link interrelating the drawing objects, and an associated node number that is the number of the node interrelating the drawing objects. In the case that the drawing object defined by the landmark unit record is the drawing object of a landmark figure indicating adjunct road facilities such as an interchange or a service area, the drawing object is related to a link or node corresponding to the position or interval of the road with the adjunct road facility related thereto with the associated link number or associated node number. In the case that the drawing object defined by the landmark unit record is the drawing object of a landmark figure indicating a facility such as a gas station, the drawing object is related to a link or node faced by the facility with the associated link number or associated node number.

In each unit record mentioned above, the link or node related to the drawing object with the associated link number or associated node number may also be several. For example, a landmark facility facing a plurality of roads may be related to a link of each road.

The resource data, as shown in FIG. 3, includes the drawing parameter data and landmark data as mentioned above, and the drawing parameter data includes a drawing data record for a figure and a drawing parameter data record for a character string.

The drawing parameter data record for a figure includes the drawing data code of the drawing data record, standard drawing parameter data, emphasis drawing parameter data, and quiet drawing parameter data, and each of the drawing parameter data defines a color, line pattern, and texture for use in drawing the drawing parameter, which is the figure. The drawing object being the figure is drawn according to the parameter data by adding emphasis thereto to a degree of the order of the quiet drawing parameter data, standard drawing parameter data, and emphasis drawing parameter data; the display pattern of the drawing object drawn according to the emphasis drawing parameter data is defined to relate to a recommended route. For indicating the relationship to the recommended route by the display pattern of the figure, which is the drawing object, the figure may be the same color as that of a route image, which will be described, indicating the recommended route, for example.

The drawing parameter data record for a character string includes the drawing data code of the drawing data record, standard drawing parameter data, emphasis drawing parameter data, and quiet drawing parameter data, and each of the drawing parameter data defines a font, size, and color for use in drawing the drawing parameter, which is the character string. The drawing object being the character string is drawn according to the parameter data by adding emphasis thereto to a degree of the order of the quiet drawing parameter data, standard drawing parameter data, and emphasis drawing parameter data; the display pattern of the drawing object drawn according to the emphasis drawing parameter data is defined to relate to a recommended route. For indicating the relationship to the recommended route by the display pattern of the character string, which is the drawing object, the character string may be the same color as that of a route image, which will be described, indicating the recommended route, for example.

In addition, the font here assigns not only a font set ordinarily designated by font names but also a subset of the font or style such as boldface and italics.

The landmark data includes a plurality of landmark records, and each landmark record includes a landmark code, landmark figure data, standard drawing attribute, emphasis drawing attribute, and quiet drawing attribute. Each display attribute defines the brightness, transparency, and frame color of the landmark figure. The landmark figure is drawn according to its attribute by adding emphasis thereto to a degree of the order of the quiet drawing attribute, standard drawing attribute, and emphasis drawing attribute;

the color, line pattern, the brightness of texture, and projective degree are determined so that the display pattern of the drawing object drawn according to the emphasis drawing attribute relates to a recommended route. For indicating the relationship to the recommended route by the display pattern of the landmark figure, which is the drawing object, the landmark frame may be the same color as that of a route image, which will be described, indicating the recommended route, for example.

The map data to be stored in the storage medium has been described above.

Next, the parameter memory 111 of the control device 1 shown in FIG. 1 will be described.

Figure 4:
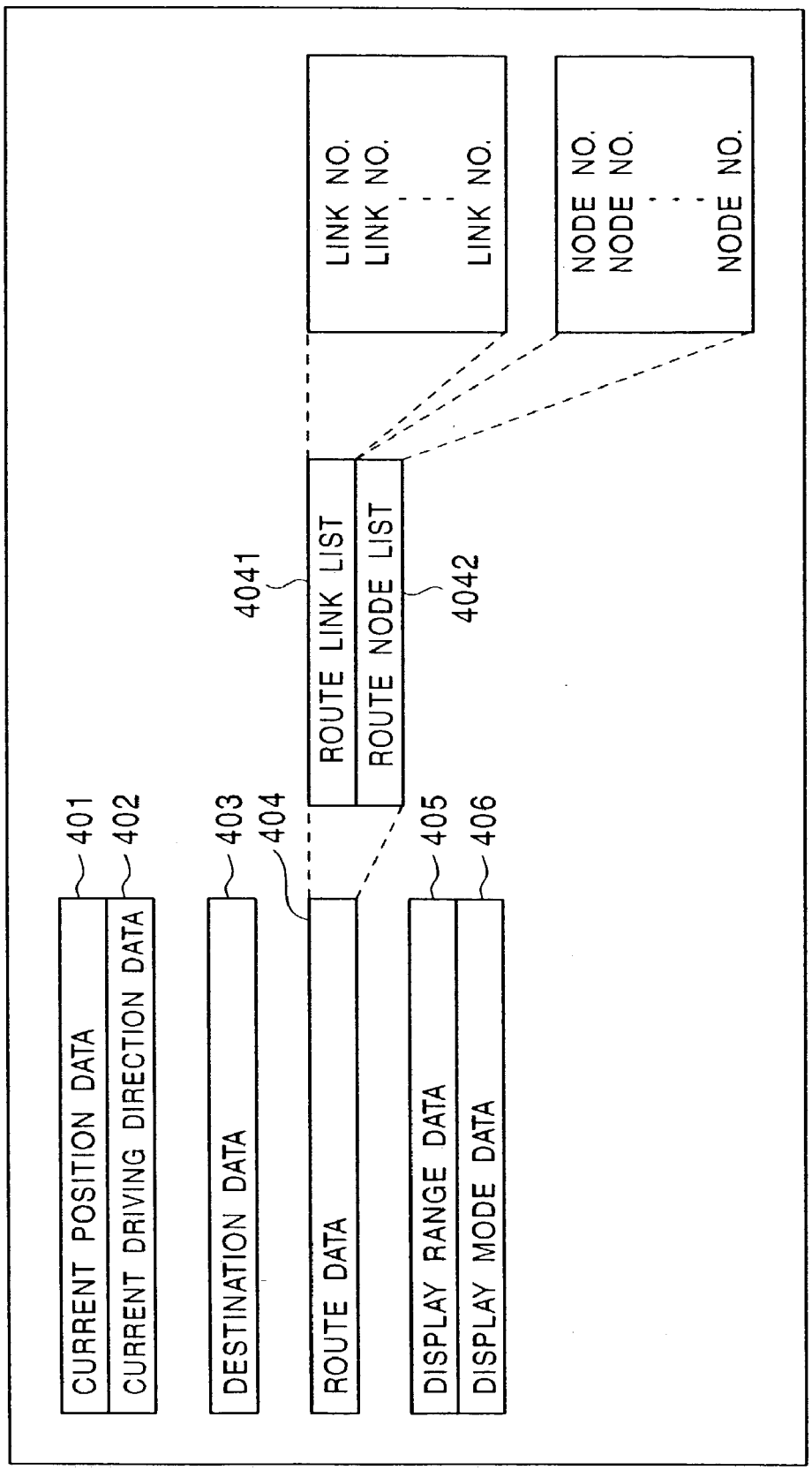
FIG. 4 illustrates the content of a parameter memory of the navigation system according to the embodiment of the present invention.

As shown in FIG. 4, the parameter memory 111 stores current position data 401, current driving direction data 402, destination data 403, route data 404, display range data 405, and display mode data 406 as parameters.

The current position data 401 is a parameter indicating the current position coordinates of a vehicle; the current driving direction data 402 is a parameter indicating a current driving direction of the vehicle; and the destination data 403 is a parameter indicating the destination coordinates. The route data indicates a route and includes a route node list 4042 describing the node numbers of nodes, through which the route runs in numerical order, and a route link list 4041 describing the link numbers of links, through which the route runs in numerical order. The display range data 405 are data assigning the map range displaying on a navigation screen, and the display mode data 406 are data displaying the display mode on the navigation screen. According to the embodiment, the display mode is provided with two modes of a standard mode and a route-guiding mode.

Referring back to FIG. 1, in such a configuration the map-data reading unit 102 reads the required range of map data out of the storage medium through the storage media drive 2 under the control of the main control unit 110 and stores it in the map data buffer 101.

The temporary current position/direction computing unit 103 computes a current position or current driving direction from information records of the angular acceleration sensor 4 and the vehicle speed sensor 5, and repeats the processing to be supplied to the map matching process unit 104. The map matching process unit 104 performs a processing to match the current position/current driving direction supplied from the GPS receiver 3 and the driving record obtained from the above with the link designated by the road unit having the corresponding area in the periphery of the current position last determined by reading from the map data buffer 101, while taking account of the current position/current driving direction supplied from the temporary current position/direction computing unit 103 and the driving record obtained from the above. Then, the map matching process unit 104 determines the most probable position on the link and the most probable link direction as the current position coordinates and current driving direction, and repeats updating the current position data 401 and current driving direction data 402 of the parameter memory 111 with the determined current position coordinates and current driving direction, respectively.

The operation of such a navigation system will be described in detail below.

Figure 5:
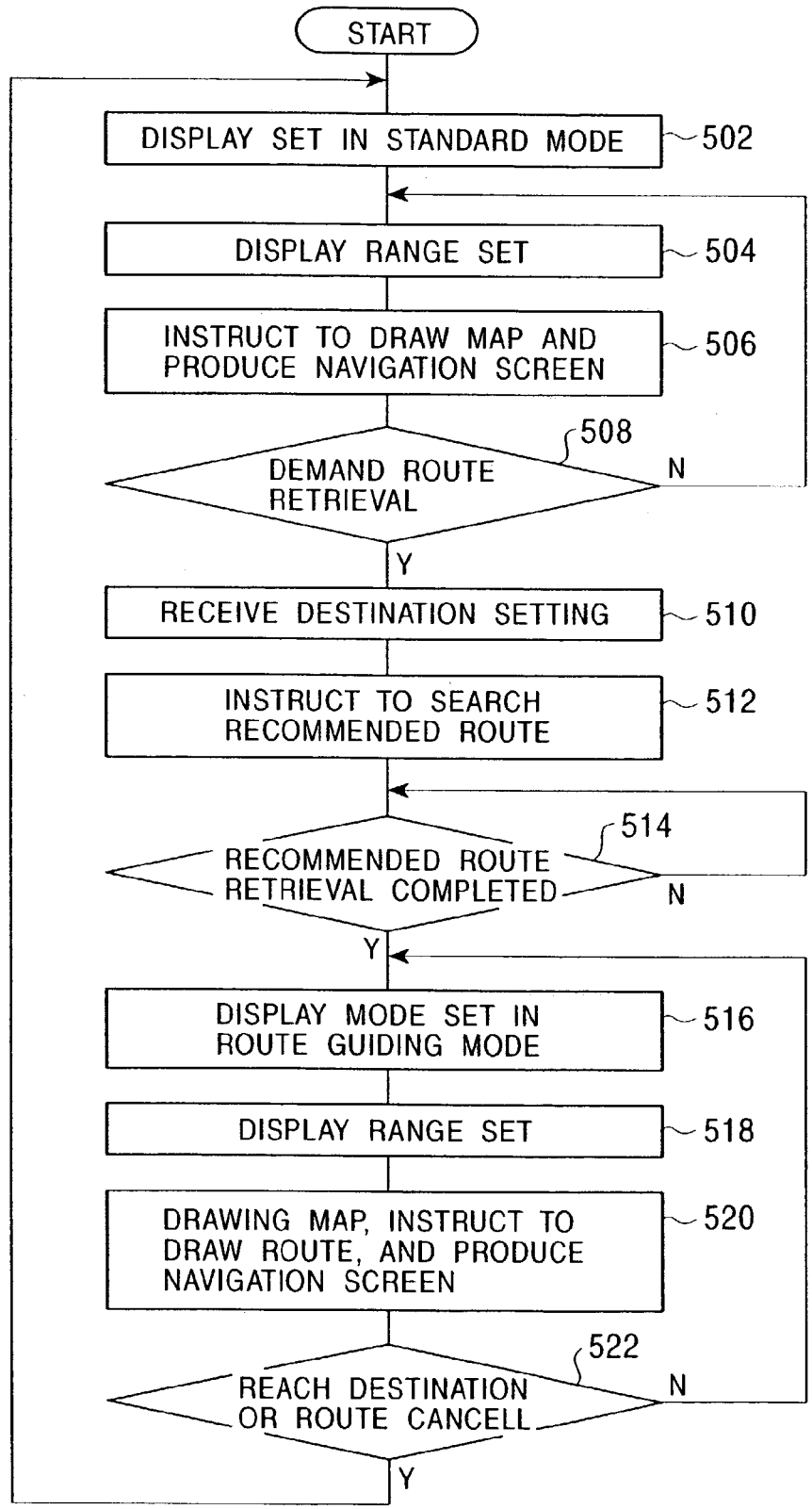
FIG. 5 is a flowchart of the operation of a main control unit of the navigation system according to the embodiment of the present invention.

FIG. 5 shows a procedure performed by the main control unit 110.

First, when the processing is started, the main control unit 110 sets the display mode 406 of the parameter memory 111 to the standard mode (S502); sets a predetermined range in the peripheral current position read out of the current position data 401 of the parameter memory 111 in the display range data 405 (S504); and instructs the map drawing unit 107 and the navigation screen producing unit 112 to produce a map screen and a navigation screen, respectively (S506).

Figure 6A:
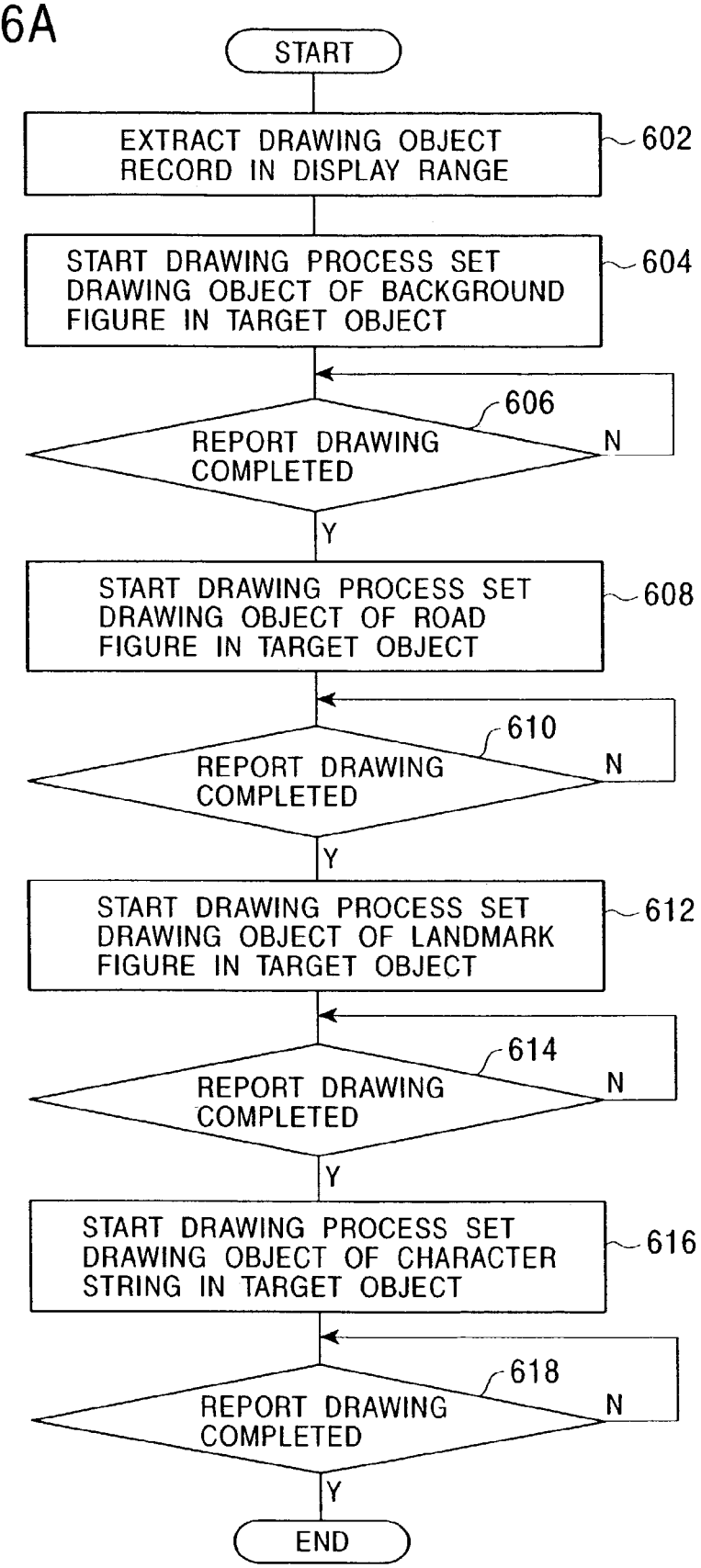
FIGS. 6A and 6B are flowcharts of the operation of a map drawing unit of the navigation system according to the embodiment of the present invention.

The map drawing unit 107, which is instructed to produce the map screen, reads out map data at a level corresponding to the display range associated with the geographical range shown by the display range, so as to perform the screen producing process shown in FIG. 6A.

That is, first, a unit record of each drawing object having a display position in the display range is extracted (S602), and the drawing object of a figure described on the extracted background unit record is set as a target object to be drawn to start drawing it (S604). Upon receiving the report of drawing completion from the drawing process (S606), the drawing object of a road figure described on the extracted background road unit record is set as a target object to be drawn to start drawing it (S608). Upon receiving the report of drawing completion from the drawing process (S610), the drawing object of a landmark figure described on the extracted landmark unit record is set as a target object to be drawn to start drawing it (S612). Upon receiving the report of drawing completion from the drawing process (S614), finally, the drawing object of a character string described on the extracted character string unit record is set as a target object to be drawn to start drawing it (S616), and upon receiving the report of drawing completion from the drawing process, the map screen producing process is completed.

The drawing processes started by the steps 604, 608, 612, and 616 mentioned above perform the processes shown in FIG. 6B.

That is, each drawing object, which is set as the target object, is sequentially selected (S632), so that if the selected drawing object is a drawing object of the road figure (S634), the drawing object is drawn with a color and width predetermined by the road attribute, and upon completing the drawing of all drawing target objects, the report of drawing completion is sent to the screen producing process shown in FIG. 6A (S652). On the other hand, if the selected drawing object is not the drawing object of the road figure but the display mode is the standard mode (S636), the drawing of the drawing object is performed with a standard drawing attribute or standard drawing parameter data (S638), and upon completing the drawing all drawing target objects, the report of drawing completion is sent to the screen producing process shown in FIG. 6A (S652).

After the drawing process described above, if the display mode is the standard mode, for the drawing object of a figure described on the background unit record, a figure having coordinates and a shape assigned in an element-point coordinate list is drawn according to standard drawing parameter data of the drawing parameter record shown in the drawing data code and using a drawing method corresponding to the figure type; for the drawing object of a character string described on the character string unit record, a character string described on the character string unit record is drawn at a display position defined by the display position information and in a direction described in the display attribute according to the standard drawing parameter data of the drawing parameter record shown in the drawing data code; and for the drawing object of a landmark figure described on the landmark unit record, a landmark figure designated by landmark figure data of the landmark record shown by the landmark code is drawn at a display position defined by the display coordinates according to the standard drawing attribute of the landmark record.

The navigation screen producing unit 112, which is instructed to produce a navigation screen by the main control unit 110, if the display mode is the standard mode, draws a current position mark at a position corresponding to the current position shown by the current position data 401 of the parameter memory 111 on the map screen produced by the map drawing unit 107 and in a direction corresponding to the direction assigned by the current driving direction data 402, so as to produce a navigation screen and supply it to the window control unit 113. The window control unit 113 displays the received navigation screen on a predetermined navigation screen window of the display 6.

Figure 7A:
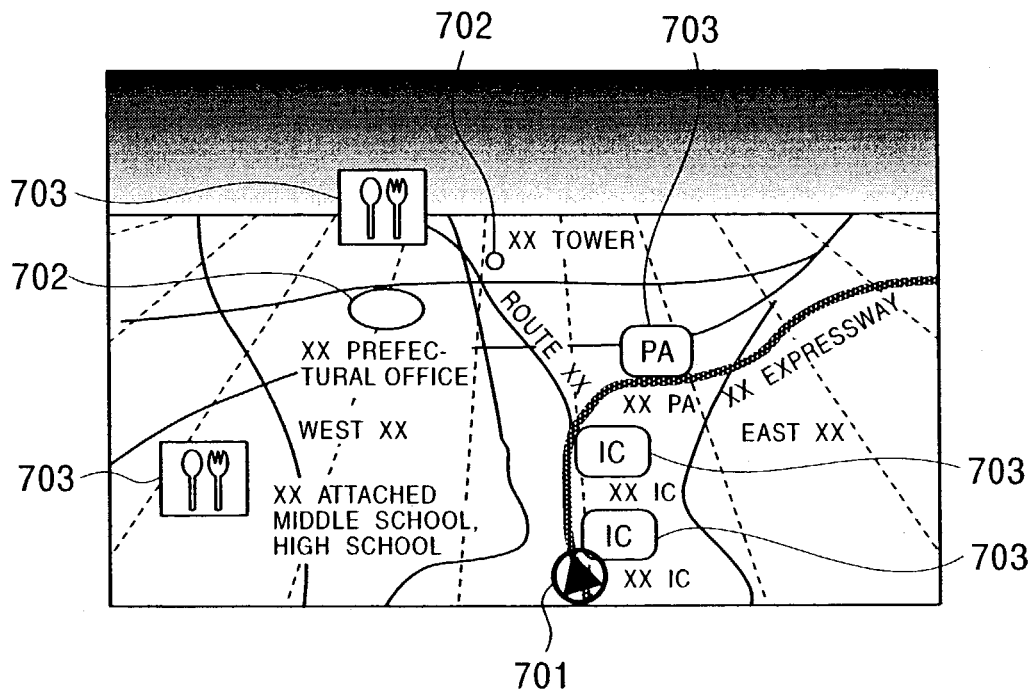
FIGS. 7A and 7B illustrate examples of a navigating screen according to the embodiment of the present invention.

An example of the navigation screen produced as above when the display mode is the standard mode is shown in FIG. 7A.

As shown in the drawing, on the navigation screen, other than road figures shown by the background road unit and various character strings shown by the character string unit, there are a current position mark 701, facility FIGS. 702 shown by the background unit and various landmark FIGS. 703 shown by the landmark unit. The road figure, character string, facility FIGS. 702, and landmark FIGS. 703 are respectively drawn in structures according to standard drawing parameters fixedly defined in advance, so that the same kind of drawing objects expressing the same kind of targets have the same structure.

Referring back to FIG. 5, the main control unit 110 periodically repeats the processes starting from the step 504 until the demand of route retrieval from a user (S508) while changing the display range data 405 corresponding to changes in the current position data 4 and an instruction of reducing map scale by the user.

On the other hand, upon being demanded the route retrieval by the user via the remote control 8 and remote control interface 109 (S508), the main control unit 110 receives a destination setting via the remote control interface 109 from the user using the remote control 8 (S510). Upon receiving the destination setting, the received coordinates of the destination are stored in the destination data 403 of the parameter memory 111 so as to instruct the route retrieval unit 105 to compute a recommended route (S512).

The route retrieval unit 105, which is instructed to compute a recommended route, reads out the road data in the required geographical range from the map data buffer 101 and computes the recommended route to the destination coordinates indicated by the destination data 403 of the parameter memory 111 from the current position coordinates indicated by the current position data 401 of the parameter memory 111 based on a predetermined cost model while referring to traffic congestion information obtained from the VICS receiver 7 and the link cost and link distance of each link described in the link table. Then, lists of the nodes and links through which the computed recommended route runs are stored in the route node list 4042 and the route link list 4041 of the route data 404 of the parameter memory 111, and completion of the recommended route computation is signaled to the main control unit 110.

The main control unit 110, which is notified of the completion of the recommended route computation (S514), establishes a route guiding mode in the display mode data 406 of the parameter memory 111 (S526), establishes an appropriate display range in the display range data 405 of the parameter memory 111 (S518), instructs the route drawing unit 106 to draw the route, instructs the map drawing unit 107 to draw the map, and instructs the navigation screen producing unit 112 to produce the navigation screen (S520).

Figure 6B:
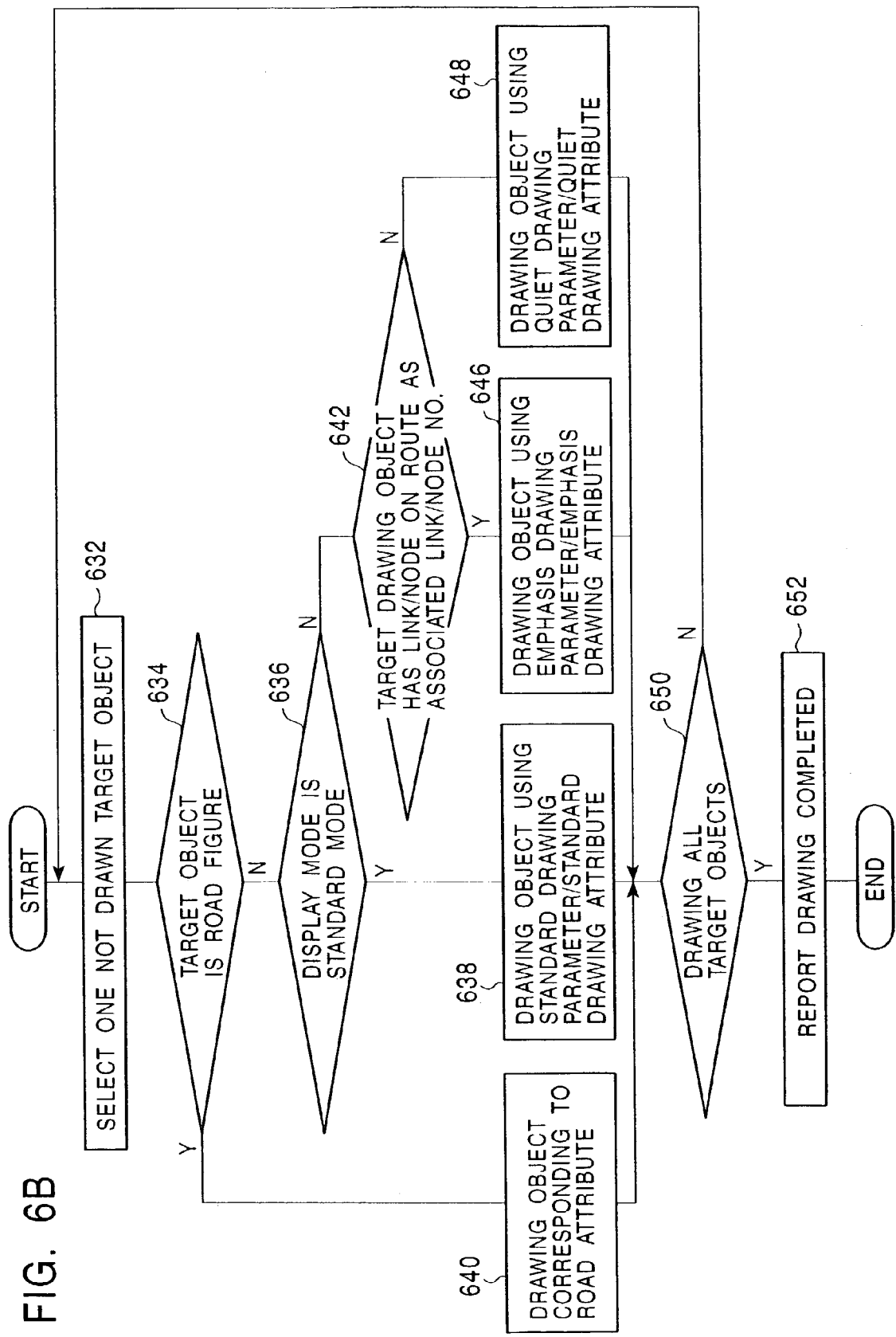

The map drawing unit 107, which is instructed to produce the map screen, performs the map screen producing process described in FIG. 6A; if the display mode is set in the route guiding mode, the drawing process started by the map screen producing process shown in FIG. 6B is performed as follows.

That is, each drawing object established in the drawing target objects is sequentially selected (S632); if the selected drawing object is a drawing object of the road figure (S634), the drawing object is drawn in the color and width predetermined by the road attribute; upon completing to draw all drawing target objects, the report of drawing completion is sent to the map screen producing process shown in FIG. 6A (S652). On the other hand, if the selected drawing object is not a drawing object of the road figure and the display mode is not the standard mode, so that it is the route guiding mode (S636), the drawing of the drawing object relating to the route (S642) is performed using the emphasis drawing attribute or emphasis drawing parameter data (S646) while drawing of the other drawing objects is performed using the quiet drawing attribute or quiet drawing parameter data (S648). Upon completing to draw all drawing target objects (S650), the report of drawing completion is sent to the map screen producing process shown in FIG. 6A (S652).

Therefore, after the drawing process described above, if the display mode is the route guiding mode, for the drawing object of a figure described on the background unit record, a figure having coordinates and a shape assigned in the element-point coordinate list is drawn using a drawing method corresponding to the figure type; if the associated link number is included in the route link list 4041 or the associated node number is included in the route node list 4042, the drawing object is drawn according to emphasis drawing parameter data of the drawing parameter record shown in the drawing data code while drawing of the other drawing objects is performed according to the quiet drawing parameter data of the drawing parameter record shown in the drawing data code.

For the drawing object of a character string described by the character string unit record, a character string described by the character string unit record is drawn at a display position defined by the display position information and in a direction described in the display attribute; if the associated link number is included in the route link list 4041 or the associated node number is included in the route node list 4042, the drawing object is drawn according to emphasis drawing parameter data of the drawing parameter record shown in the drawing data code, otherwise it is drawn according to the quiet drawing parameter data of the drawing parameter record shown in the drawing data code.

For the drawing object of a landmark figure described by the landmark unit record, a landmark figure designated by landmark figure data of the landmark record shown by the landmark code is drawn at a display position defined by the display coordinates; if the node number is included in the route node list 4042, it is drawn according to the emphasis drawing attribute of the landmark record, otherwise it is drawn according to the quiet drawing attribute of the landmark record.

The route drawing unit 106, which is instructed to draw a route, draws the route in the display range shown by the display range data 405 of the parameter table from the current position indicated by the current position data 401 of the parameter table to the destination indicated by the destination data 403 so as to produce the route screen by referring to the route link list 4041 and the route node list 4042 of the parameter table.

Then, if the display mode is set to the route guiding mode, the navigation screen producing unit 112 draws a route screen produced by the route drawing unit 106 on the map screen produced by the map drawing unit 107 and received therefrom and draws a current position mark thereon at a position corresponding to the current position shown by the current position data 401 of the parameter memory 111, so as to produce the navigation screen and provide it to the window control unit 113. The window control unit 113 displays a navigation screen window on the display 6 for displaying the received navigation screen.

Figure 7B:
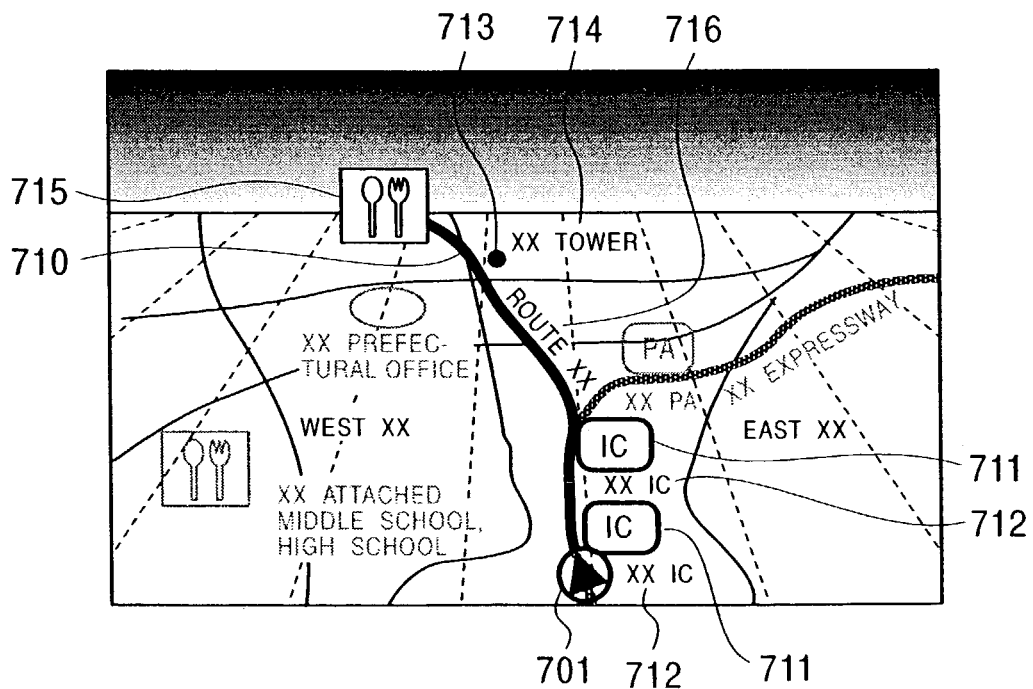

An example of the navigation screen produced as above when the display mode is the route guiding mode is shown in FIG. 7B.

As shown in the drawing, on the navigation screen, in the same way as on the navigation screen in the standard mode shown in FIG. 7A, there are road figures shown by the background road unit, various character strings shown by the character string unit, the current position mark, the facility figures shown by the background unit, and various landmark FIGS. 703 shown by the landmark unit. However, different from the navigation screen in the standard mode shown in FIG. 7A, while a route display 710 of the recommended route being included, the road figures, character strings, facility figures, and landmark figures are drawn in different shapes depending on whether they are related to links or nodes through which the recommended route runs, with the associated link number or associated node number. That is, in the example shown in the drawing, a landmark FIG. 711 showing an adjacent road facility along the recommended road, a character string 712 showing an adjacent road facility along the recommended road, a facility FIG. 713 facing the recommended road, a facility name 714 facing the recommended road, a landmark FIG. 715 facing the recommended road, and a road name 716 of a road through which the recommended road runs are emphasized for display in comparison to the case of the standard mode shown in FIG. 7A, while other objects are quietly displayed in comparison to the case of the standard mode shown in FIG. 7A.

Accordingly, a user can instantly comprehend targets relating to the recommended route on the navigation screen.

Referring back to FIG. 5, the main control unit 110 repeats the processes described above starting from the step 516 until the current position reaches the destination or the present route is cancelled (S522) while changing the display range data 405 corresponding to changes in the current position data 401 of the parameter memory 111 and to an instruction to change a map scale by a user, and then, the display mode is returned to the standard mode by returning back to the step 502.

The embodiment according to the present invention has been described above.

According to the embodiment, the drawing object is related to the link and node with the associated link number and associated node number; however, it may be related to any one of the link and node, and the drawing object may be related to a road expressing element other than the link and node. For example, the drawing object may be related to an element point of the background road unit record. In any case, in the same way as in the above embodiment, the drawing object related to the road expressing element, through which the recommended route runs, may be emphatically displayed in comparison to the other drawing objects of the same kind.

As described above, in the route guiding mode, the drawing object related to the link and node through which the recommended route runs is displayed in a configuration different from that of the standard mode and from other drawing objects; alternatively, the configuration of the drawing object may be manipulated with other techniques as long as in the route guiding mode, the drawing object related to the link and node through which the recommended route runs is emphatically displayed in comparison to the other drawing objects of the same kind, or the drawing object designates the relationship to the recommended route. For example, the drawing object related to the link and node through which the recommended route runs may be emphatically displayed in comparison with the standard mode while the other objects may be displayed in the same manner as in the standard mode; the drawing object related to the link and node through which the recommended route runs may be displayed in the same manner as in the standard mode while the other objects may be quietly displayed in comparison with the standard mode. Similarly, the drawing object related to the link and node through which the recommended route runs may be displayed in the same color as that of the route screen of the recommended route so that the display configuration of the drawing object designates the relationship to the recommended road while the other objects may be displayed in the same manner or quietly displayed in comparison with the standard mode.

As described above, the manner of display is switched between the standard mode and the drawing mode for the three elements of a font, size, and color when the drawing object is a character string while for a figure and landmark figure, it is switched for the three of elements of a color, brightness, and transparency; alternatively, an arbitrary element may be used for the switching as long as it can switch the display configuration. For example, for the character string object, an element such as the presence of an outline or underlining, background color, transparency, and blinking may be used for the switching while for the figure and landmark figure, an element such as contrast, size, and blinking may be used.

As described above, only the objects defined to relate to a link or a node through which the recommended route runs are displayed in configurations different from the other objects; alternatively, the drawing objects defined to relate to a link or a node of a road connecting to the recommended route also may be displayed in the same configurations as those of the drawing objects defined to relate to a link or a node through which the recommended route runs. The link or node of the road connecting to the recommended route can be obtained as a link having a route number common to a link outside the recommended route having an end as a node through which the recommended route runs, or as a node to be an end of the link.

Figure 8A:
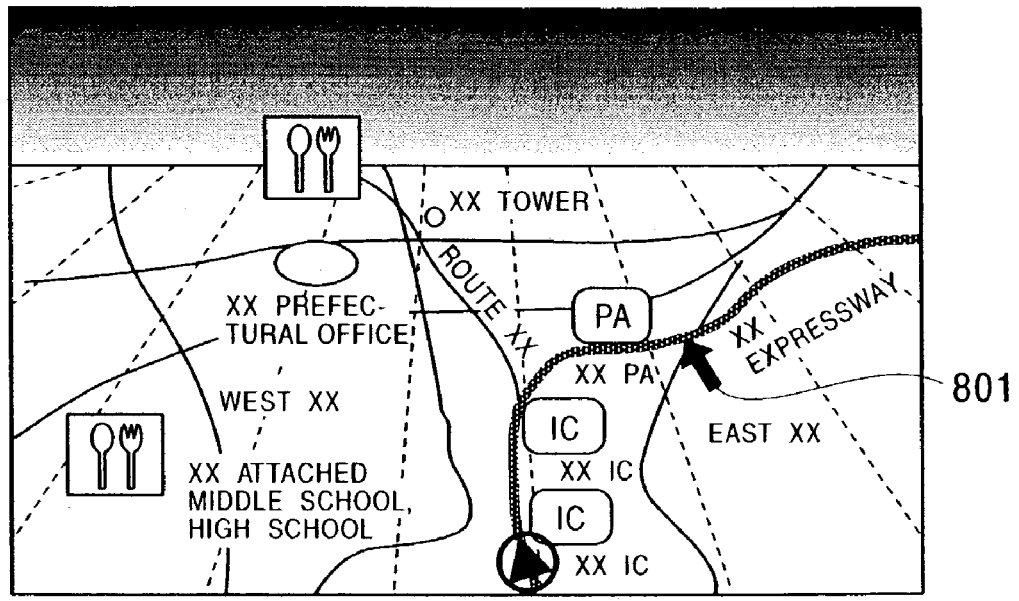
FIGS. 8A and 8B illustrate examples of a navigating screen according to the embodiment of the present invention.
Figure 8B:
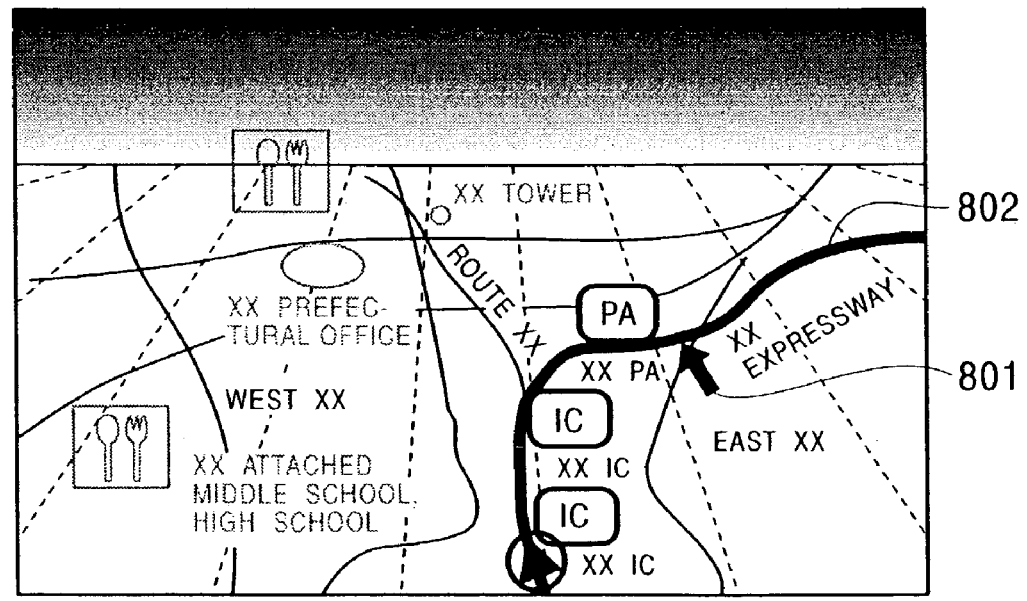

According to the embodiment described above, a mode may be provided in which drawing objects related not to the recommended route but to an arbitrary route, road, or link are displayed in a different configuration. For example, as shown in FIG. 8A, if the designation of a link or road by a user using a pointer 801 is received, the drawing objects related to links constituting the received link and road 802 may be displayed with emphasis, as shown in FIG. 8B. In such a manner, the user can instantly recognize a target on the map relating to a road or link by designating the road or link. In addition, this map displaying technique may be applied not only to the navigation system but also to arbitrary devices for displaying a map.

When a plurality of recommended routes are simultaneously displayed on the map and a route is selected by a user from among them, the drawing objects related to all recommended routes may be displayed in a configuration different from the other objects. Also, in this case, the route screen of each recommended route can be displayed in a different color, and drawing objects related to each recommended route may be displayed in the same color as that of the route screen of their associated route so that the correspondence to the route is visible.

According to the embodiment described above, in the route guiding mode, for all or some of the drawing objects such as a landmark, character string, and facility figure, only the drawing objects relating to the recommended route may be displayed while the other objects may not be displayed.

According to the described embodiment, a vehicle-mounted navigation system is used as an example to incorporate the invention. However, a portable navigation system, a personal computer, and a route retrieval system operating on a web server may incorporate the invention. Also, a navigation system receiving the required map data as needed from a map data server via a communication link such as the Internet, without a memory medium locally storing map data, may incorporate the invention.

As described above, according to the present invention, a target relating to a route on a map can be more intuitively recognized by a user.

What is claimed is:

1. A navigation system for displaying a route to a destination, comprising:
   a memory unit for storing map data comprising road, figure, and character string information, the road information defining each road as at least one link with a node at each end and comprising a node list or a link table, or both, the figure and character string information for each figure or character string, respectively, comprising an associated link number or an associated node number, or both;
   a drawing unit for drawing a map from the map data, the map including roads, figures, and character strings generated from the road, figure, and character string information, respectively;
   a route retrieval unit for determining a route to a destination based upon the map data, the route being defined by route data comprising a route link list or a route node list, or both; and
   a screen for displaying the route on the map;
   wherein the drawing unit emphasizes figures and character strings displayed on the screen which are associated with the route, the figures and character strings displayed with emphasis are identified by matching the link numbers in the route link list with the associated link numbers in the figure and character string information for each figure or character string, respectively, or matching the node numbers in the route node list with the associated node numbers in the figure and character string information for each figure or character string, respectively, or both.

2. The navigation system of claim 1, wherein the figure and character strings displayed on the screen that are not associated with the route are deemphasized, at least one of the emphasized figures represents an interchange, and one of the emphasized figures represents the destination of the recommended route.

3. A navigation system for displaying a route to a destination, comprising:
   a memory unit for storing map data comprising road and object information, the road information defining each road as at least one link with a node at each end, the object information for each object comprising an associated link number or an associated node number, or both;
   a drawing unit for drawing a map from the map data, the map including roads and objects generated from the road and object information, respectively;
   a route retrieval unit for determining a route to a destination based upon the map data, the route being defined by route data comprising a route link list or a route node list, or both; and
   a screen for displaying the route on the map;
   wherein the drawing unit emphasizes objects displayed on the screen which are associated with the route, the objects displayed with emphasis are identified by matching the link numbers in the route link list with the associated link numbers in the object information for each object or matching the node numbers in the route node list with the associated node numbers in the object information for each object, or both.

4. The navigation system of claim 3, wherein the objects displayed on the screen that are not associated with the route are deemphasized while remaining discernible, the objects deemphasized comprise figures and character strings.

5. The navigation system of claim 3, wherein the node list comprises a node record for each node including a node number, node coordinates, and a number of a link in the link table to which the node is connected.

6. The navigation system of claim 3, wherein the link table comprises a link record for each link including a link number, a starting node number, a terminating node number, and the number of lanes.

7. The navigation system of claim 3, wherein the route node list is a list of node numbers of nodes through which the route runs in order.

8. The navigation system of claim 3, wherein the route link list is a list of link numbers of links through which the route runs in order.

9. The navigation system of claim 3, wherein at least one object is a character string displayed on the screen vertically or at an inclined angle.

10. A navigation system of claim 3, wherein the objects which are not associated with the route data are removed from the screen.

11. The navigation system of claim 3, wherein the object information includes standard, emphasis, and quiet drawing parameter data.

12. The navigation system of claim 3, wherein the emphasized objects are distinguished from other objects by size or blinking.

13. The navigation system of claim 3
    wherein the drawing unit deemphasizes the objects displayed on the screen which are not associated with the route data and emphasizes every landmark figure and facility figure along the route simultaneously and every character string associated with the route.

14. The navigation system of claim 13, wherein the objects deemphasized include landmark figures, facility figures, and character strings.

15. A navigation system mounted on a vehicle for displaying a route to a destination, comprising:
    a memory unit for storing map data comprising road and object information;
    a drawing unit for drawing a map from the map data, the map including roads and objects generated from the road and object information, respectively;

a route retrieval unit for determining a route, defined by route data, to a destination based upon the map data; and a screen for displaying the route on the map;

wherein the drawing unit emphasizes objects displayed on the screen that are associated with the route data regardless of vehicle speed and vehicle location as the vehicle travels along the route and independently of user-selected queries and alters non-route objects displayed on the screen that are not associated with the route without removing the non-route objects from the screen such that the non-route objects remain visibly recognizable, the non-route objects include interchange figures, service area figures, landmark figures, and character strings.

16. A navigation system of claim 15, wherein the objects displayed on the screen which are emphasized comprise facility figures, landmark figures, and character strings, the facility figures represent at least interchanges and service areas.

17. A navigation system of claim 15, wherein the character strings displayed on the screen correspond to road names, landmark names, and facility names, including interchange identifiers.

18. A navigation system for displaying a route to a destination, comprising:

a memory unit for storing map data comprising road and object information;

a drawing unit for drawing a map from the map data, the map including roads and objects generated from the road and object information, respectively, the objects comprise facility figures, landmark figures, and character strings;

a route retrieval unit for determining multiple recommended routes to a destination based upon the map data, each route defined by route data; and a screen for simultaneously displaying the multiple routes on the map;

wherein the drawing unit illustrates the multiple routes on the screen simultaneously by distinguishing the objects which are associated with route data for at least one route from other objects, the objects distinguished for each route include facility figures, landmark figures, and character strings and are identified by matching link numbers in a route link list with associated link numbers in the object information for each object or matching node numbers in a route node list with associated node numbers in the object information for each object, and alters non-route objects displayed on the screen not associated with any route without erasing the non-route objects from the screen such that the non-route objects remain visibly recognizable, the non-route objects include interchange figures, service area figures, landmark figures, and character strings.

19. The navigation system of claim 18, wherein each route is displayed in a different color and the objects associated with each of the routes are displayed in the same color as that of the associated route.

20. A navigation system for displaying a route to a destination, comprising:

a memory unit for storing map data comprising road, figure, and character string information;

a drawing unit for drawing a map from the map data, the map including roads, facility figures, landmark figures, and character strings generated from the road, facility figure, landmark figure, and character string information, respectively, the facility figures represent at least interchanges and service areas;

a route retrieval unit for determining a route, defined by route data, to a destination based upon the map data; and a screen for displaying the route on the map;

wherein the drawing unit emphasizes interchanges, service areas, landmark figures, and character strings displayed on the screen that are associated with the route data and at least one character string is displayed vertically or at an inclined angle, the character strings emphasized correspond to road names, landmark figures, interchanges, and service areas, and, simultaneously, the drawing unit alters non-route objects displayed on the screen that are not associated with the route data without removing the non-route objects from the screen such that the non-route objects remain visibly recognizable, the non-route objects include interchange figures, service area figures, landmark figures, and character strings.

* * * * *